Jan. 8, 1929.

C. NAGLE 1,697,996

DAMPER CONTROL FOR LEERS

Filed Feb. 18, 1928

Witness
Winslow B. Thayer

Inventor:
Claude Nagle
by Robson D. Brown
Attorney

Patented Jan. 8, 1929.

1,697,996

UNITED STATES PATENT OFFICE

CLAUDE NAGLE, OF ELMIRA, NEW YORK, ASSIGNOR TO HARTFORD-EMPIRE COMPANY, OF HARTFORD, CONNECTICUT, A CORPORATION OF DELAWARE.

DAMPER CONTROL FOR LEERS.

Application filed February 18, 1928. Serial No. 255,394.

This invention relates to leers for annealing glassware, and more particularly to a simplified temperature controlling mechanism for leers of the continuous tunnel type such as are shown in the patent to the Hartford-Empire Company, No. 1,560,481, granted November 3, 1925, assignee of Vergil Mulholland.

It has been found that the operation of leers of this type requires a certain amount of labor in adjusting the various dampers. This labor is increased in the event that the type of ware being annealed is changed or the rate of delivery of ware to the leer varied. Both of these changes cause a variation in the amount of heat delivered to the leer in the ware and cause such changes in the temperatures along the leer as would be harmful to the quality of the annealed ware if it were not soon corrected. Due to the number of adjustments to be made, this correction is sometimes difficult to carry out quickly and accurately, especially for a single operator, which is all that is ordinarily required. Also, serious results in the annealing of glass may be caused by improper attention to the various damper settings by an inefficient employee, and the possibilities of such injury being caused from this source is greatly lessened by my provision for reducing the necessary manual adjustments to a minimum.

An object of my invention, therefore, is to provide a bank adjustment for a plurality of dampers, controlling the temperature gradient in a leer tunnel which permits proper unitary control of the dampers throughout large portions of the leer.

A further object of my invention is to provide a means by which the temperatures within the leer may be quickly controlled with a minimum amount of work and at the same time the proper temperature gradient maintained. To accomplish this latter object, it is desirable in many instances to provide a differential motion of the various dampers. Further objects of my invention, therefore, are to provide a bank damper control in which provision is made for controlling a plurality of dampers selectively, both as to degree of operation and as to their operating range, that is, it is sometimes desirable that a particular damper be opened a certain amount for the minimum capacity of the leer and then opened to a greater extent than other dampers to adjust the temperatures in the leer to accommodate greater amounts of glass per minute. It is also desirable in many instances to open some dampers faster than others, that is, assuming two dampers to be entirely closed when the leer is operated at its minimum capacity, it may be desirable to have one ¾ open and others only ¼ or ½ open when a predetermined greater rate of feed of glass to the leer is employed. This invention includes means for making these adjustments.

A further object of the invention is to provide for the expansion of the leer under the influence of the heat therein without varying or affecting the setting of any damper.

Other objects and advantages of the invention will be apparent from a reading of the following specification and subjoined claims when taken in connection with the accompanying drawings, in which:

Figure 1:
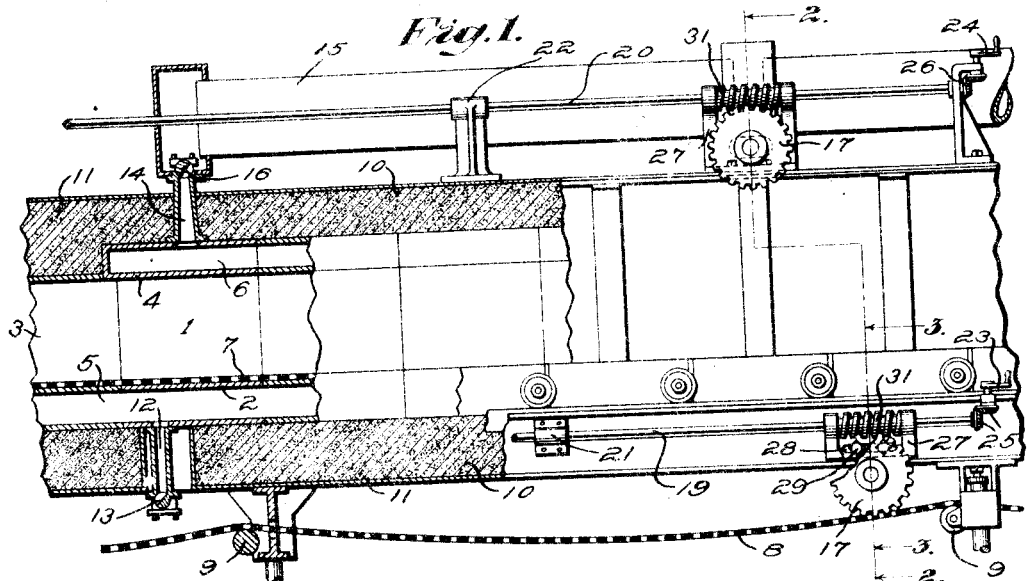
Figure 1 is an elevation of a portion of a tunnel leer with some parts broken away and in section to show the interior construction.
Figure 2:
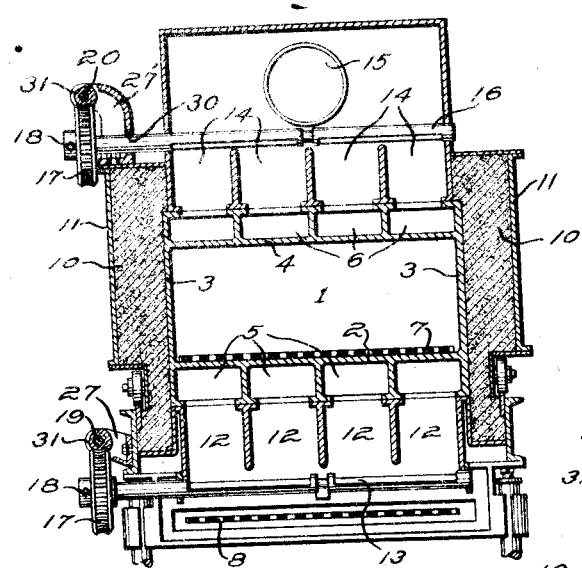
Fig. 2 is a section substantially on the line 2—2 in Fig. 1.
Figure 3:
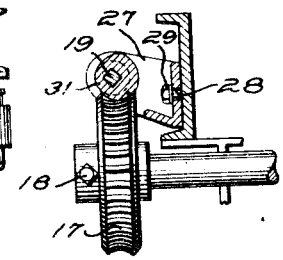
Fig. 3 is an enlarged section on the line 3—3 in Fig. 1 and substantially similar to portions of Fig. 2.

The leer comprises a tunnel 1 having a bottom or floor 2, sides 3 and a top 4, heating flues 5 being formed in the bottom and cooling flues 6 in the top, as in the patent to Mulholland above referred to. The ware is carried through the leer on an endless reticulated wire mesh belt indicated at 7, the ware bearing strand of which is supported directly upon the bottom 2 of the leer tunnel, the idle strand 8 returning beneath the leer where it is supported at spaced intervals by rollers 9. The tunnel may be insulated in any suitable manner, as by surrrounding it with a layer of loose insulating material 10, such as kieselguhr, which may be retained in place by an outer casing 11, preferably of sheet metal.

Means are disposed at spaced intervals along the heating flues 5 for admitting controllable amounts of air to cool the gases and thus maintain the desired temperature gradient within the leer, such means comprising a plurality of stacks or passages 12 collectively extending completely across the leer and provided with suitable rotatable dampers 13 for controlling the amounts of air admitted. Flues 6 may be provided with similar stacks 14 communicating with an air conduit 15 and controlled by dampers 16 for the purpose of diverting cooling air entering the flue 6 at the outlet end of the leer to the air conduit 15 which may lead to a suitable suction device (not shown), the suction device preferably communicating also with the flues 5.

Each of the dampers 13 and 16 is shown as a cylindrical rod having cut out portions, but it is to be understood that any desired type of damper may be employed. A worm wheel 17 is removably secured to the end of each of the damper rods in any suitable manner, as for example, by a set screw 18. The worm wheels 17 may be fixed to the damper rods in any desired angular relation, thus providing an angular adjustment therebetween which would have the effect of shifting the range of adjustment by the bank control device later to be described.

Longitudinally extending rods 19 and 20 are provided for operating the lower and upper dampers respectively as a bank control. These rods are mounted in suitable bearings 21 and 22 respectively and are provided with operating handles 23 and 24 respectively, which may be fixed directly to the rods or operatively connected therewith through any suitable means such as the bevel gears 25 and 26 shown. If desired, suitable unitary means may be employed for simultaneously rotating both rods.

Adjacent to each of the dampers and the worm wheel 17 fixed thereto is bracket yoke 27 or 27' which is fixed to the leer frame, preferably in such a way as to permit adjustment of the bracket longitudinally with respect to the leer. I have shown for this purpose elongate slots 28 in the brackets through which bolts 29 extend, the bolts being threaded into suitable apertures in the leer. The upper brackets 27' have the same purpose as the brackets 27, but are somewhat differently shaped and are in addition provided with elongate apertures 30 for the passage of the upper damper rods 16.

The brackets 27 and 27' are designed to embrace the operating rods 19 and 20 respectively, and a worm 31 is suitably mounted on these rods between the arms of each of the brackets. The worm may be splined on the rod, or, as I have shown here, the rod may be square and the worm provided with a square hole, thus permitting the longitudinal movement of the worms on the rods while positively driving the worms and their cooperating worm wheels 17 by the rotation of the rods.

Thus it will be seen that by rotating the handles 23 and 24, rods 19 and 20 will be respectively rotated, thereby controlling the lower dampers 13 and the upper dampers 16 respectively through the meshing of the worms 31 and wormwheels 17, all of the dampers in each bank being moved simultaneously. If it is desired to vary the range of movement of any one damper with respect to any or all of the others, this may be done by shifting the brackets 27 longitudinally of the leer, thus shifting the associated worm 31, which is of a size to just fit between the arms of the bracket, and rotating the cooperating worm wheel 17 in the desired direction according to the direction of movement of the bracket 27.

If, for any reason, it is found desirable to vary the degree or rate of change of adjustment of certain of the dampers from that of others, this may be done by substituting a worm and worm wheel having a different pitch. For the most efficient operation of leers of this type, it has been found that the desired settings of the various dampers would require the use of worms and wheels having at least two different pitches.

The splined connection between the worms and their operating shafts automatically accommodates any longitudinal expansion of the leer under the influence of heat as each worm is retained in a fixed position with respect to its meshing worm wheel by its associated bracket which is fixed to the leer closely adjacent to said worm wheel.

While I have shown and described but one embodiment of my invention, it is obvious that certain modifications might be made therein without departing from the spirit of the invention as set forth in the appended claims, which are to be construed as broadly as the state of the prior art permits.

I claim:

1. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod operatively connected to said certain dampers, means for moving said rod to operate the dampers associated therewith, and means in said connections to permit the longitudinal expansion of the leer by heat without influencing the settings of said dampers.

2. Apparatus for annealing glassware comprising a tunnel, a flue associated therwith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, a bracket yoke fixed to the leer adjacent to each of said worm wheels, and a worm coacting with each of said worm wheels, each of said worms being disposed between the arms of one of the bracket yokes, and mounted in fixed angular but longitudinally movable relation to said rod, whereby to permit the longitudinal expansion of the leer by heat without influencing the settings of said dampers.

3. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, a bracket yoke fixed to the leer adjacent to each of said worm wheels, a worm meshing with each of said worm wheels, each of said worms being disposed between the arms of one of the bracket yokes, and mounted in fixed angular but longitudinally movable relation to said rod, whereby to permit the longitudinal expansion of the leer by heat without influencing the settings of said dampers, and means for permitting the independent adjustment of the range of movement of certain of said dampers in response to the bank control.

4. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, a bracket yoke secured to the leer adjacent to each of said worm wheels, and a worm meshing with each of said worm wheels, each of said worms being disposed between the arms of one of the bracket yokes and mounted in fixed angular but longitudinally movable relation to said rod, whereby to permit the longitudinal expansion of the leer by heat without influencing the settings of said dampers, certain of said brackets being longitudinally adjustably mounted on the leer, whereby to permit the adjustment of the range of movement of the dampers associated with such adjustably mounted brackets independently of the bank and of each other.

5. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, and a worm mounted on said rod for driving each of said worm wheels, said worms and wheels being removable, whereby to permit their substitution by other worms and wheels having different pitches to vary the degree of possible adjustment of certain of said dampers with respect to others in the bank.

6. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, and a worm mounted on said rod for driving each of said worm wheels, certain of said worms and wheels having a greater pitch than others in the bank, whereby the degree of possible adjustment of those dampers having worms and wheels of greater pitch is greater than the others operated by the same bank control.

7. Apparatus for annealing glassware comprising a tunnel, a flue associated therewith, a plurality of dampers disposed at intervals along said flue for controlling the temperatures therein, means for collectively controlling the settings of certain of said dampers including a longitudinally extending rod, means for rotating said rod, a worm wheel mounted to be rotatable with each of said certain dampers, a bracket yoke fixed to the leer adjacent to each of said worm wheels, and a worm meshing with each of said worm wheels, each of said worms being disposed between the arms of one of the bracket yokes, and mounted in fixed angular but longitudinally movable relation to said rod, whereby to permit the longitudinal expansion of the leer by heat without influencing the settings of said dampers, and independent means for varying the degree of adjustment of certain of said dampers with a given movement of the said rod.

8. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, a bracket yoke fixed to the leer adjacent to each of said worm wheels, a worm meshing with each of said worm wheels, each of said worms being disposed between the arms of one of the bracket yokes, and mounted in fixed angular but longitudinally movable relation to said rod, whereby to permit the longitudinal expansion of the leer by heat without influencing the settings of said dampers, means for varying the degree of adjustment of certain of said dampers with a given movement of the said rod, and means for permitting the independent adjustment of the range of movement of certain of said dampers in response to the bank control.

9. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel mounted to be rotatable with each of said certain dampers, a bracket yoke fixed to the leer adjacent to each of said worm wheels, a worm meshing with each of said worm wheels, each of said worms being disposed between the arms of one of the bracket yokes, and mounted in fixed angular but longitudinally movable relation to said rod, whereby to permit the longitudinal expansion of the leer by heat without influencing the settings of said dampers, means for adjusting the position of certain of said worms longitudinally of said rod to vary the range of movement of the dampers associated therewith, and means for varying the degree of adjustment of certain of said dampers with a given movement of the said rod.

10. Apparatus for annealing glassware comprising a tunnel, a flue associated therewith, a plurality of dampers disposed at intervals along said flue for controlling the temperatures therein, and means for collectively controlling the settings of certain of said dampers including a longitudinally extending rod, means for rotating said rod, a worm wheel removably fixed to each of said dampers, a bracket yoke longitudinally adjustably mounted on the leer adjacent to each of said wheels and having a pair of arms which embrace said rod, and a worm mounted in fixed angular but longitudinally movable relation to said rod between each pair of arms, whereby the leer may expand longitudinally by heat without varying the relative position of each worm and its co-operating worm wheel and consequently the position of the damper associated therewith, and whereby the range of movement of each damper may be independently adjusted by the longitudinal adjustment of its associated bracket, each of said worms and their associated wheels being of such pitch that a predetermined degree of movement of their associated damper may be had.

Signed at Baltimore, Md., this 15 day of February, 1928.

CLAUDE NAGLE.